March 17, 1936. C. H. W. CHELTNAM ET AL 2,034,023
SEPARATOR
Filed March 20, 1935 2 Sheets-Sheet 1
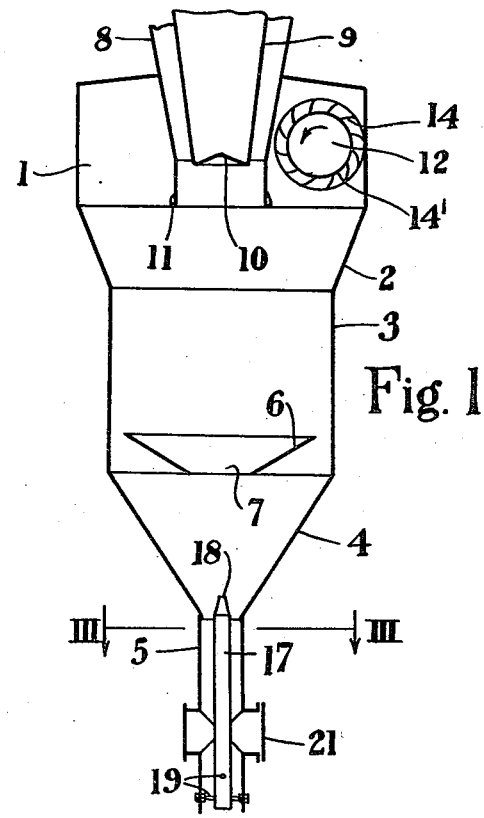
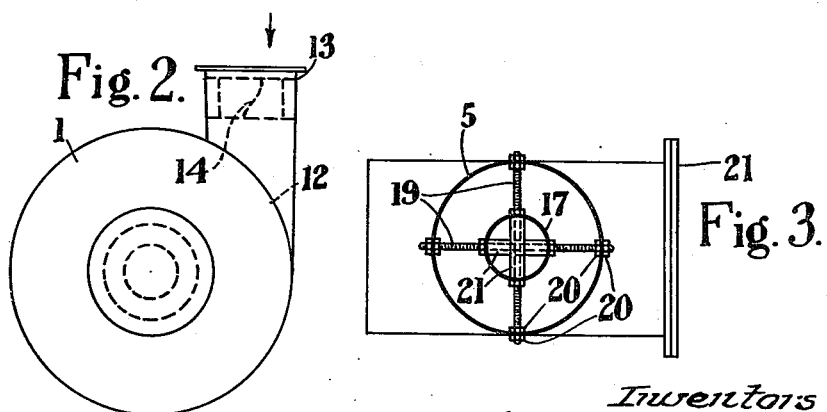
Inventors
Charles H. W. Cheltnam
Cyril H. Cheltnam
By
Atty March 17, 1936.  C. H. W. CHELTNAM ET AL  2,034,023
SEPARATOR
Filed March 20, 1935  2 Sheets-Sheet 2
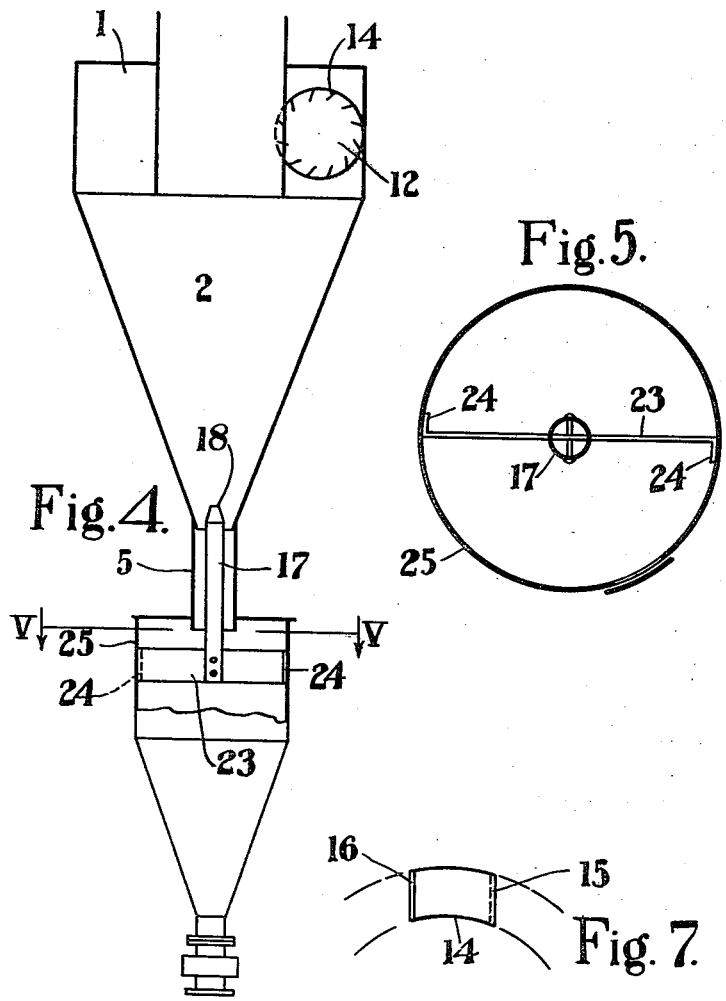
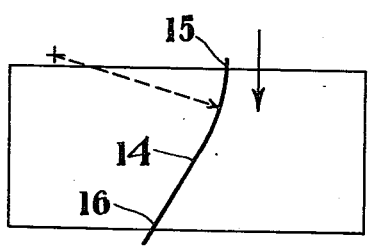

Patented Mar. 17, 1936

2,034,023

UNITED STATES PATENT OFFICE 2,034,023

SEPARATOR

Charles Henry Wood Cheltnam and Cyril Henry Cheltnam, London, England

Application March 20, 1935, Serial No. 12,092
In Great Britain March 20, 1934

2 Claims. (Cl. 183—80)

This invention relates to "centrifugal" separators for separating and collecting dust, that is, fine particles of matter, whether solid or liquid, from dust-laden air and other gases, and to the class of such separators in which the dust-laden air or other gas is propelled tangentially into a vessel of circular or approximately circular section, the more or less dust-free air or other gas being discharged axially.

Throughout the specification and claims, the term "dust" is used to include small solid and liquid particles, and the terms "gas" and "fluid" are used to include air and other gases.

The object of this invention is to reduce the turbulence which exists in separators of the class above described, and thereby to increase the efficiency of separation and reduce the resistance to the flow of gas. The points at which turbulence is most destructive of separation efficiency are where the conveying fluid enters the vessel through the tangential inlet-duct, and, in the case where the dust is discharged axially, at the entrance to the dust-discharge pipe.

When gas is projected tangentially into a vessel of circular or scroll-shaped cross-section, two vortex rings are set up which rotate in opposite directions in any longitudinal section and "gear" together at their adjacent surfaces, the vortex ring adjacent to the inlet and feeding into the other. The incoming stream of air, which has only a linear motion, creates turbulence where its joints one of the vortex rings and consequently a certain amount of the dust laden air spills into the outlet for the cleaned air. This turbulence also retards the natural speed of rotation in the longitudinal section of the vortex rings, thereby reducing the axial component of their velocity, and thus the velocity of the surface of the vortex ring remote from the axial fluid outlet, upon which the ejection of the dust into the dust-pipe depends, is reduced.

One of the objects of the present invention is to provide means for imparting to the incoming stream of dust laden gas, and before its entry into the separator, a rotary motion about its axis in the same direction of rotation as that of the natural rotation of the vortex ring which it joins. Said means may comprise blades or vanes attached to the usual tangential inlet piece or be inserted in the pipe leading thereto, and they may be shallow vanes arranged around and inside the periphery of the inlet pieces or pipe so as to form a multiple screw-thread, or said means may comprise a propeller blade or blades extending diametrically across the inlet piece or pipe, the propeller blades being secured to a central boss.

Other objects of the invention will be made clear by the following description.

Various forms of separator of the class hereinbefore mentioned may be constructed according to the present invention; and two forms of separator according to the invention are illustrated diagrammatically in the accompanying drawings, in which:

Figure 1 is a sectional elevation through a dual separator.

Figure 2 being a plan corresponding thereto, and

Figure 3 being a sectional plan, on a larger scale, on the line III—III of Figure 1.

Figure 4 is an elevation, partly in section, of a single separator.

Figure 5 being a sectional plan on the line V—V of Figure 4.

Figures 6 and 7 are, respectively, a plan and an elevation of one blade such as is suitable for use in the tangential inlet pipe of the separator.

The dust separator illustrated by Figures 1 to 3 is a dual separator such as that described in the specification of British Patent No. 406,036 and comprises a cylindrical head 1, an inverted conic frustum 2, cylindrical part 3, second inverted conic frustum 4, axial dust eduction or discharge pipe 5, and a coned plate 6 having a central hole 7, which plate constitutes the bottom of the primary separator and top of the secondary.

The head 1 is fitted with a gas outlet diffuser comprising an inverted conic frustum 8 and a cylinder or liner 9 sealed at its lower end by a cone 10. The frustum 8 has a cylindrical extension having a flanged or rounded lower edge 11.

The gas inlet 12 to the head 1 is arranged as before to direct the dust laden air or gas tangentially into the head 1, but for the reasons hereinbefore referred to, the connection 13 for the gas pipe, in front of the inlet 12, is fitted internally with a number of vanes 14 which impart to the stream of gas a rotary motion about the axis of the connection 13, which motion is in the same direction as that occurring about the circular axis of the vortex-ring in the head 1, at the longitudinal section where the tangential inlet stream meets the said vortex-ring.

Each vane 14 may be of the form illustrated by Figures 6 and 7, that is, it may consist of a blade having a part 15 presenting an edge to the stream of air or gas and curving but slightly and gently from a plane containing the longitudinal axis of the connection 13, and a part 16 curving more abruptly from said plane, the outer longer edge of the blade conforming to the inner cylindrical surface of the connection 13 and the inner longer edge being parallel to the outer longer edge.

The blades 14 may be secured directly to the inner surface of the connection 13, or they may be secured to the inner surface of a liner ring which may be fitted into the connection, in which case the blades and ring form a unit. The vanes or blades 14 are arranged in the connection 13 so that they are set back from the actual inlet 12 in order that the gas emerging from them has actually a rotary motion about the axis of the connection 13 before it enters the head 1 and joins the vortex-ring therein, thus avoiding or reducing any tendency for the gas to splay as it enters the head 1. The dust laden gas thus enters the head 1 and smoothly merges into the vortex-ring in the head, maintaining or accelerating rather than retarding or disturbing the rotary movement of that ring. Turbulence at the entry and the resulting spilling over of dust-laden gas into the gas outlet is thus avoided. Moreover, the natural speed of rotation in the longitudinal section of the vortex-rings being maintained, there is no reduction of the axial component of their velocity in regard to the surface of the separator and thus the velocity of the surface of the vortex-ring in the parts 2 and 3 and of those below the plate 6, upon which velocity the ejection of the dust down the separator and into the dust-pipe 5 depends, are not reduced.

Considering the turbulence which occurs at the entrance of the dust discharge pipe, the dust is discharged axially from the narrow end of the conic frustum 4 by being carried along the inner surface thereof at high speed by the axial component of the surface-velocity of the adjacent vortex ring. The dust, with any entrained gas, is flung into the dust pipe from whence the air returns to the central evacuative column in the separator chamber. The entrained gas enters the dust pipe in a form resembling a bundle of sticks tied at the middle of their length and splayed at their ends. Turbulence occurs at the center of the dust-pipe and some of the precipitated dust is carried into the evacuative column by the rising entrained gas.

In order to prevent turbulence at the dust outlet, the axial dust discharge pipe 5 is provided with a cylindrical core or post 17. The post may be hollow, but, if so, it must be sealed and preferably at its inner end, where it extends into the narrow end of the frustum 4, by means of a flat disc, dome or cone 18. The external diameter of the post is approximately half of the diameter of the dust hole, so that an unobstructed annular passage is formed for the passage of the dust from the separator.

The post 17 is supported by two-screw-threaded stays 19 which pass diametrically through the post 17 and the pipe 5, the two stays being at different levels and at right angles to one another and being secured by nuts 20, adjustment of which enables the post to be set co-axially with the pipe 5. A ferrule 21 on each stay inside the post prevents distortion of the post when the nuts are tightened. The supports for the posts are well below the dust outlet and, therefore, they will not retard the rotation of the gas and dust in the dust pipe, which retardation would prevent the dust being held against the wall of the dust pipe and out of the way of any returning gas.

The pipe 5 is shown provided with a door 21.

The post 17 acts as a deflector for dust which is flung into the pipe 5 and might otherwise collide in the central core of the pipe and, with any entrained gas, set up turbulence, resulting in some dust being carried back into the frustum 4. Any entrained air will return up the surface of the post to the frustum 4, whereas the dust is deflected downwards.

The avoidance of turbulence, by means of the present invention, at the inlet for dust laden gas increases the efficiency of a pressure operated plant and increases the efficiency of a suction operated plant to that of the new efficiency of a pressure operated plant. The avoidance of turbulence at the dust outlet still further increases the efficiency of the apparatus.

Two tangential inlets (not shown) for dust laden gas may be provided, one to each of the vortex rings formed in the separator chamber, each inlet piece or pipe being provided with blades or vanes, the pitch of the vanes of one inlet being of opposite hand to those of the other inlet in accordance with the natural direction of rotation of the vortex rings.

The post 17 in the dust-pipe 5 also shields the dust-pipe, any valves therein and the usual dust hopper, into which the pipe discharges, from the deep depression existing in the separator about its axis.

The single separator illustrated by Figures 4 and 5, comprising a cylindrical head 1 and single inverted conic frustum 2, is shown provided with similar means for avoiding turbulence at the entry of the gas and in the dust-pipe 5, similar reference numerals indicating corresponding parts to those referred to above. The post 17 is supported at its lower end by a plate 23, which passes diametrically through the post and has flanges 24 welded or otherwise secured to a dust-hopper 25 of known type.

It will be understood that the separators above described are intended more particularly for the separation of fine dust, in which operation the avoidance of turbulence is particularly desirable in order to ensure high efficiency.

We claim:

1. A centrifugal separator for separating and collecting dust (e. g. fine particles of matter) from gas, comprising a vessel of substantially circular section having an inlet for dust-laden gas, means for directing a stream of dust-laden gas through said inlet tangentially into said vessel to set up vortex-rings in said vessel, an axial outlet for gas, an axial outlet for dust, and means in front of said inlet for imparting to said stream of dust-laden gas, before it enters said vessel a rotary motion about its axis in the same direction as that of the rotary motion of the vortex-ring which it joins, for the purpose of avoiding turbulence.

2. A centrifugal separator for separating and collecting dust from gas, comprising a vessel of substantially circular cross-section having an inlet for dust-laden gas, an inlet connection for directing a stream of dust-laden gas through said inlet tangentially into said vessel to set up vortex-rings therein, an axial outlet for gas, an axial outlet for dust, and curved vanes in said connection and in front of said inlet for imparting to the stream of dust-laden gas a rotary motion about its axis in the same direction as that of the rotary motion of the vortex ring which it joins for the purpose of avoiding turbulence at the said inlet to the vessel.

CHARLES HENRY WOOD CHELTNAM.
CYRIL HENRY CHELTNAM.

CERTIFICATE OF CORRECTION.

Patent No. 2,034,023.　　　　　　　　　　　　　　　March 17, 1936.

CHARLES HENRY WOOD CHELTNAM, ET AL.

It is hereby certified that error appears in the printed specification of the above numbered patent requiring correction as follows: Page 1, first column, line 29, for "and" read end; and line 32, for the words "its joints" read it joins; and that the said Letters Patent should be read with these corrections therein that the same may conform to the record of the case in the Patent Office.

Signed and sealed this 18th day of August, A. D. 1936.

(Seal)　　　　　　　　　　　　　　　　　　　Henry Van Arsdale
　　　　　　　　　　　　　　　　　　　Acting Commissioner of Patents.